United States Patent Office 3,257,190
Patented June 21, 1966

3,257,190
METHOD OF ELIMINATING WEED GRASSES AND BROADLEAF WEEDS
Quentin F. Soper, Indianapolis, Ind., assignor to Eli Lilly and Company, Indianapolis, Ind., a corporation of Indiana
No Drawing. Filed Dec. 10, 1962, Ser. No. 243,631
7 Claims. (Cl. 71—2.3)

This application is a continuation-in-part of my copending application Serial No. 53,066, filed August 31, 1960.

This invention relates to novel processes for eliminating germinating and seedling weed grasses and selected broadleaf weeds and to compositions useful in these novel processes. More particularly, this invention relates to novel processes for eliminating germinating and seedling weed grasses and selected broadleaf weeds employing conditions in which an N,N-di-substituted 2,6-dinitroaniline is the active ingredient. This invention further provides a novel group of extremely active 2,6-dinitroaniline compounds having a trifluoromethyl group in the 4 position of the aniline ring.

The novel process of this invention which provides for the elimination of germinating and seedling weed grasses and selected broadleaf weeds, comprises applying to an area infested therewith an effective amount of a compound represented by one of the following formulas:

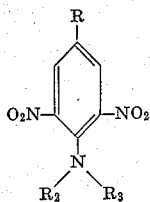

and

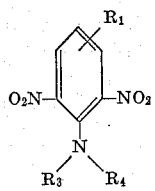

wherein R is H, lower alkoxy or di-lower alkyl carbamyl; $R_1$ is lower alkyl, cyano, halo-substituted lower alkyl or halo; $R_2$ is ethyl, n-propyl, n-butyl, sec-butyl, isobutyl, or lower alkyloxy-substituted lower alkyl; and $R_3$ and $R_4$, taken singly, are $C_1$–$C_5$ alkyl, $C_2$–$C_5$ alkenyl, $C_2$–$C_5$ alkynyl, halo-substituted $C_2$–$C_5$ alkenyl, lower alkyloxy-substituted lower alkyl, and di-lower-alkyloxy-substituted lower alkyl; $R_2$ and $R_3$, and $R_3$ and $R_4$, when taken together with the nitrogen atom to which they are attached, form a member of the group consisting of pyrrolidino and piperidino radicals; subject to the restriction that the sum of the carbon atoms in the hydrocarbon chains of $R_2$ and $R_3$ together, and of $R_3$ and $R_4$ together, is less than nine.

In the above formulas, when the term "lower alkyl" is employed, it signifies a carbon chain containing from 1–3 carbon atoms. Illustrative of these lower alkyl groups are the methyl, ethyl, n-propyl, and isopropyl radicals. Illustrative lower alkoxy-lower alkyl groups which $R_2$, $R_3$, and $R_4$ can represent, illustrative di-lower-alkoxy lower alkyl groups which $R_3$ and $R_4$ can represent and illustrative halo-substituted lower alkyl groups which $R_1$ can represent thus includ methoxyethyl, ethoxyethyl, n-propoxyethyl, dimethoxyethyl, 2-ethoxypropyl, 4-isopropoxypropyl, trifluoromethyl, pentafluoroethyl, 3-chloropropyl, trichloromethyl, iodomethyl, bromomethyl, astatinylmethyl, and the like.

When $R_3$ and $R_4$ in the above formulas represent $C_1$–$C_5$ alkyl, $C_2$–$C_5$ alkenyl, or $C_2$–$C_5$ alkynyl groups they can be illustratively methyl, ethyl, n-propyl, isopropyl, n-butyl, isobutyl, sec-butyl, n-amyl, isoamyl, sec-amyl, 1-methylisobutyl, allyl, propargyl, 2-butynyl, 1-butynyl, 3-methyl-1-butynyl, crotyl, methallyl, 2-pentynyl, and the like. The halo atoms which $R_1$ represents and which are present in the halo-alkenyl radicals which $R_3$ and $R_4$ represent or in the halo-substituted lower alkyl radicals which $R_1$ can represent can be any of the members of the 7th main group of Periodic System including fluorine, chlorine, bromine, iodine, and astatine. Illustrative haloalkenyl groups include chloroallyl, bromoallyl, astatinylallyl, 4-chloro-2-butenyl, 4-bromo-1-butenyl, 3-iodo-2-pentenyl, and the like.

The following compounds are illustrative of those which are useful in the herbicidal process of this invention:

N,N-di-n-propyl-3-chloro-2,6-dinitroaniline
N,N-di-n-butyl 4-fluoro-2,6-dinitroaniline
N,N-diethyl 4-trichloromethyl-2,6-dinitroaniline
N,N-di-n-butyl 3-ethyl-2,6-dinitroaniline
N-ethyl-N-n-butyl 2,6-dinitroaniline
N-methyl-N-n-propyl 2,6-dinitro-p-toluidine
N,N-dimethyl 2,6-dinitro-m-toluidine
N,N-di-n-propyl 4-n-propyl-2,6-dinitroaniline
N,N-di-n-propyl 4-isopropyl-2,6-dinitroaniline
N-n-propyl-N-n-butyl 4-(3-bromopropyl)2,6-dinitroaniline
N-ethyl-N-n-propyl 4-isopropyl-2,6-dinitroaniline
N,N-di-n-propyl 4-cyano-2,6-dinitroaniline
N,N-di-n-propyl 4-bromo-2,6-dinitroaniline
N,N-diethyl 4-(2-chlorethyl)2,6-dinitroaniline The novel compounds provided by this invention can be represented by the following formula:

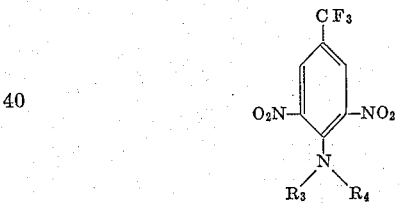

wherein $R_3$ and $R_4$ have the same meaning as hereinabove. These compounds show a considerably greater herbicidal activity against germinating and seedling weed grasses and broadleaf weeds than the corresponding compounds wherein the trifluoromethyl group is replaced by a lower alkyl group. Illustrative compounds coming within the scope of the above formula include:

N,N-di-n-propyl 4-trifluoromethyl-2,6-dinitroaniline
N-ethyl-N-n-butyl 4-trifluoromethyl-2,6-dinitroaniline
N,N,-dimethyl 4-trifluoromethyl-2,6-dinitroaniline
N-methyl-N-allyl 4-trifluoromethyl-2,6-dinitroaniline
N,N-di-(3-butynyl) 4-trifluoromethyl-2,6-dinitroaniline.

The heribcidal processes of this invention comprise applying a herbicidally effective amount of a compound coming within the scope of one of the above formulas to an area infested with seedling or germinating weed grasses, grass weed, or broadleaf weed seeds, or broadleaf weeds either in the seedling or mature stage of growth. The compounds preferably are formulated for herbicidal use either as sprays made up by adding water to emulsifiable concentrates or wettable powders, as granules or as dispersions on carriers such as attapulgite clay granules, peat moss, fertilizer, vermiculite, etc. The compounds are quite insoluble in water, and hence, for the preparation of emulsions or wettable powders, the compounds are preferably formulated with wetting agents.

Herbicidal formulations containing a compound represented by one of the above formulas as the active ingredient are useful in eliminating seedling or germinating weed grasses and broadleaf weeds in various stages of growth from such areas as gravel walks, shoulders of roads, fence rows, clay tennis courts, flower gardens, drainage ditches, woodland areas, and the like. The compounds can also be applied to crop-bearing areas either in-row or between rows of crops. Suitable crop areas that can be thus treated include: cotton, soybean, tobacco, or tomato fields, strawberry patches, and the like. It is a considerable advantage of this invention that the N,N-di-substituted-2,6-dinitroanilines as defined above do not affect the growth of crop plants either in the seedling or mature stages of growth at concentrations which virtually eliminate germinating and seedling grasses and broadleaf weeds from an area infested therewith. Thus, the herbicidal compositions of this invention can be applied as herbicides to crops either in the pre- or post-emergent stage of growth although, in general, there is less likelihood of damage to the crops if the compounds are applied post-emergent to the crop. Among the crop plants, in addition to those listed above, which will tolerate concentrations of a N,N-di-substituted-2,6-dinitroaniline sufficient to kill germinating and seedling grasses and broadleaf weeds are the following: collards, great northern beans, kidney beans, navy beans, cowpeas, safflower, peppers, peanuts, snapbeans, cauliflower, watermelon, brussel sprouts, cabbage, kale, asparagus, vetch, chard, white potatoes, lettuce, beets, carrots, rutabaga, lima beans, grean peas, alfalfa, lespedeza, cucumbers, muskmelons, parsnips, okra, broccoli, sunflowers, pumpkins, radishes, sweet potatoes, peppermint, flax, and related species.

As would be expected, fields containing established crop plants which belong to the grass family; that is to say, monocotyledonous plants such as sweet corn, field corn, barley, wheat, rye, Japanese millet, German millet, sorghum, etc., can be safely treated for the elimination of germinating seedling grasses and broadleaf weeds with herbicidal compositions containing a N,N-di-substituted-2,6-dinitroaniline as the active ingredient. It is also a considerable advantage accruing to the herbicidal compositions of this invention that they can also be applied pre-emergent to many of the above crop plants belonging to the grass family because the particular crops show greater resistance to the herbicidal effects of the compounds than do the grass weeds also present in the crop growing areas. Thus, with many of the grass crop plants, there is a rate of application of a herbicidal composition prepared according to this invention which will eliminate many of the germinating and seedling grass weeds and broadleaf weeds from the crop area without affecting the growth of the crop plant.

The herbicidal compositions of this invention containing a N,N-di-substituted-2,6-dinitroaniline as the active ingredient can be applied to the crop area for the purpose of eliminating seedling weed grasses and broadleaf weeds from that area, either by hand or broadcast treatment either at the time of planting or after the crop has passed the seedling stage of growth as a lay-by treatment. It is also possible to apply compositions of this invention between the rows of plants which are themselves quite susceptible to the herbicidal action of the compositions. The type of treatment chosen depends upon cost and upon the type of damage to the plant to be expected from an overdose of the herbicide as well as other factors.

Herbicidal compositions containing a compound coming within the scope of one of the above formulas as its active ingredient can be employed by the processes of this invention to eliminate the following grasses in the seedling stage from an area infested therewith. Undesirable grasses such as the crabgrasses (*Digitaria sanguinalis* and *Digitaria ischaemum*); green and yellow foxtails (*Setaria viridis* and *Setaria glauca*); Johnson grass (*Sorghum halepense*); goosegrass (*Eleusine indica*); sandbur (*Cenchrus pauciflorus*); witchgrass (*Panicum capillare*); and the like, as well as the seedlings of desirable grasses such as oats (*Avena sativa*); Bermuda grass (*Cynodon dactylon*); Kentucky bluegrass (*Poa pratensis*); bentgrass (*Agrostis tenuis*); fescues (Festuca sp.); orchard grass (*Dactylis glomerata*); red top (*Agrostis alba*); sorghum (*Sorghum vulgare*); German millet (*Setaria italica*); Japanese millet (*Echinochloa crusgalli* var. *frumentacea*); and the like.

Among the broadleaf weeds which can be eliminated by an application to an area infested with such weeds in various stages of growth or with weed seeds are included particularly members of the genus Amaranthus such as pigweed, the genus Polygonum such as smartweed; the genus Chenopodium such as lamb's-quarter; the genus Stellaria such as chickweed; the genus Mollugo such as carpetweed; the genus Salsola such as Russian thistle; as well as members of the following genera: Kochia, Galinsoga, and Portulaca.

In addition to their use as herbicides in crop growing areas, along road sides and gravel walks, etc., the N,N-di-substituted-2,6-dinitroanilines coming within the scope of the above formulas can be suitably formulated for use to eliminate germinating and seedling weed grasses, particularly crabgrass and foxtail, from established lawns containing desirable grasses such as bluegrass, zoysia, St. Augustine grass, bentgrass, fescue, and Bermuda grass. It is a further advantage of the processes of this invention that there is such a large difference between the ability of grasses in the germinating or seedling stages of growth and in the mature stage of growth to withstand the herbicidal effects of the N,N-di-substituted-2,6-dinitroanilines employed in such herbicidal processes that these compounds can be used to eliminate weed grasses from areas where the desirable grass is established.

The herbicidal compositions of this invention are applied to those areas wherein it is desired to eliminate seedling grass weeds and broadleaf plants at rates varying from 0.1 to 20 lbs. per acre depending upon the nature of the area itself. For example, excessive amounts of even the most active herbicidal N,N-di-substituted-2,6-dinitroaniline can be applied to driveways, road sides, etc., since there is no question of an overdose harming desirable plants. In addition many turfs, particularly those of Kentucky bluegrass and Bermuda grass are very resistant to high concentrations of even the most active of the compounds represented by the above formulas such as the 4-trifluoromethyl compounds. In other situations, however, where as excess of the dinitroaniline would deleteriously affect the growth of the plant, it is necessary to choose with care a dosage of the herbicidial compound which will not damage the crop seedling or mature crop plant or grass turf and to apply the compound at the particular chosen dosage. As will be seen from Table 1 which follows, for most of the compounds listed therein, there is a considerable safety factor present between that dosage which will virtually eliminate seedling weed grasses and that dosage which will do even minimal damage to the crop plants or established grasses.

The ability of the compositions of this invention to kill germinating and seedling weed grasses was demonstrated by the following experimental procedure: A soil was prepared consisting of one part masonry sand and one part shredded top soil blended together in a cement mixer. One gallon of this soil was placed in a 25 x 35 cm. galvanized flat and was patted down with a bench brush until level. A three-row marker was used to make 2½ cm. deep furrows in approximately two-fifths of the flat. Crop seeds consisting of four kernels of corn, five cotton seeds and five soybean seeds were placed in these furrows. A four-row template was then placed on the remaining soil, and the indicated amounts of each of the following seeds were planted, one species to each section: German millet, 100 mg.; broadleaf mustard (*Brassica juncea*), 50–75 mg.; rough pigweed, 30–50 mg.; and large crabgrass, 350–400 mg. Sufficient soil was added to cover the entire flat. Thus, the weed seeds were covered to a depth of about 6 mm. and the crop plant seeds were covered to a depth of about 3 cm.

In assaying the effect of the compositions as pre-emergent herbicides, a flat prepared as above, taken either on the day of planting or on the next day, was placed in a chamber equipped with a turntable and an air exhaust. The herbicidal composition, whether it was a spray-type emulsion or a dispersed powder, was applied to the flat with a modified De Vilbiss atomizer hooked to an air source. Twelve and one-half ml. of the composition under test were applied to each flat either on the day of planting or the succeeding day. Injury ratings and observations as to type of injury were made in either case eleven to twelve days after treatment. The injury rating scale used was as follows:

0—no injury
1—slight injury
2—moderate injury
3—severe injury
4—death

When more than one determination was carried out, an average value was calculated for the injury rating.

The following table sets forth the results of pre- and post-emergent testing of many N,N-di-substituted-2,6-dinitroaniline compounds. In the table, column 1 gives the name of the compound; column 2, the rate in terms of pounds per acre at which the compound was applied to the test flat; and the succeeding columns, the injury rating for the particular plant seeds or seedlings.

TABLE 1.—INJURY RATING

| Compound | Lb./acre | Pre-emergent Treatment | | | | | | | Post-emergent Treatment | | | | | | |
|---|---|---|---|---|---|---|---|---|---|---|---|---|---|---|---|
| | | Corn | Cotton | Soybeans | Crabgrass | Mustard | Pigweed | Foxtail | Corn | Cotton | Soybeans | Crabgrass | Mustard | Pigweed | Foxtail |
| N,N-di-n-propyl-2,6-dinitroaniline. | 8 | 2.3 | .3 | 1 | 4 | 2.7 | 3.7 | 4 | .8 | .7 | 1.2 | 1.8 | 1.7 | 1.8 | 1.5 |
| | 4 | 1.1 | .1 | .2 | 4 | 1.9 | 3.9 | 4 | .3 | .3 | .6 | 1.3 | 1.3 | 1.3 | 1.4 |
| | 2 | .4 | .1 | 0 | 3.8 | 1.0 | 3.2 | 3.8 | .3 | .1 | .1 | 1.6 | 1.0 | .9 | 1.3 |
| | 1 | 0 | 0 | 0 | 3.0 | .2 | 2.9 | 3.2 | 0 | .2 | .2 | 1.5 | .2 | .8 | .7 |
| | .8 | 0 | 0 | 0 | 2.8 | 0 | 2.0 | 2.7 | | | | | | | |
| | .6 | 0 | 0 | 0 | 2.0 | 0 | 1.2 | 2.2 | | | | | | | |
| | .4 | 0 | 0 | 0 | 1.0 | 0 | 0 | 2.1 | | | | | | | |
| | .2 | 0 | 0 | 0 | .2 | 0 | 0 | .6 | | | | | | | |
| N,N-di-n-propyl-4-trifluoromethyl-2,6-dinitroaniline. | 8 | 3 | 1.3 | 3.3 | 4 | 3 | 4 | 4 | .3 | .7 | .7 | 1.7 | 1.0 | .3 | 1.7 |
| | 4 | 2.8 | .8 | 3.0 | 4 | 2.8 | 4 | 4 | .3 | 0 | 0 | 1.3 | 1.7 | .3 | 1 |
| | 3 | 2 | 0 | 2 | 4 | 2 | 4 | 4 | | | | | | | |
| | 2 | 2.2 | 0 | .2 | 4 | 1.8 | 4 | 4 | .5 | .5 | 0 | 1.5 | .5 | 0 | .5 |
| | 1 | 1.9 | .6 | .6 | 4 | 1.1 | 4 | 4 | | | | | | | |
| | .8 | 2 | .3 | .3 | 3.8 | 1.3 | 4 | 4 | | | | | | | |
| | .5 | 0 | 0 | 0 | 3.5 | 0 | 4 | 4 | | | | | | | |
| | .4 | .7 | .3 | .3 | 3.8 | 0.8 | 4 | 4 | | | | | | | |
| | .2 | .3 | 0 | .3 | 3.2 | 0 | 3.6 | 3.8 | | | | | | | |
| N,N-di-n-propyl-4-cyano-2,6-dinitroaniline. | 8 | 0 | 0 | 0 | 3.5 | 2 | 3.5 | 4 | | | | | | | |
| | 4 | 0 | 0 | 0 | 3 | .5 | 2 | 3 | | | | | | | |
| | 2 | 0 | 0 | 0 | 3 | 1 | 2 | 4 | | | | | | | |
| | 1 | 0 | 0 | 0 | 3 | 0 | 2 | 3 | | | | | | | |
| N,N-di-n-propyl-4-chloro-2,6-dinitroaniline. | 8 | ------ | 1 | 1 | 4 | 3 | 4 | 4 | 0 | 1 | 1 | 3 | 2 | 2 | 2 |
| | 4 | 2 | 0 | 0 | 4 | 3 | 3 | 4 | 0 | 0 | 1 | 3 | 3 | 2 | 0 |
| | 2 | 2 | 0 | 0 | 4 | 2 | 4 | 4 | 0 | 1 | 0 | 3 | 2 | 2 | 0 |
| | 1 | 0 | 0 | 0 | 3.8 | .8 | 2.8 | 4 | | | | | | | |
| | .8 | 0 | 0 | 0 | 3.8 | 0 | 2.8 | 4 | | | | | | | |
| | .6 | 0 | 0 | 0 | 3.2 | 0 | 2.2 | 3.8 | | | | | | | |
| | .5 | 0 | 0 | 0 | 3 | 0 | 1 | 3 | | | | | | | |
| | .4 | 0 | 0 | 0 | 2.8 | 0 | 1.8 | 3.3 | | | | | | | |
| | .2 | 0 | 0 | 0 | 1.5 | 0 | .8 | 2 | | | | | | | |
| N,N-di-n-propyl-2,6-dinitro-p-toluidine. | 8 | 2.3 | .3 | 2.7 | 4 | 3 | 4 | 4 | 1.3 | 1.7 | 2.0 | 3 | 2 | 2.7 | 2 |
| | 4 | 2.7 | 0 | .7 | 4 | 2.7 | 4 | 4 | .7 | 1.3 | 2.0 | 2.7 | 2 | 1.3 | 2 |
| | 2 | 1 | 0 | 0 | 4 | 3 | 4 | 4 | .3 | 1 | 1.3 | 2 | 1.7 | 1 | 1.7 |
| | 1 | .5 | 0 | 0 | 3.9 | 1.3 | 3.9 | 4 | 0 | 0 | 0 | 1.5 | 2 | 1 | 1 |
| | .8 | .3 | 0 | 0 | 3.9 | .7 | 3.6 | 4 | | | | | | | |
| | .6 | .1 | 0 | 0 | 3.6 | .7 | 3.7 | 3.9 | | | | | | | |
| | .4 | 0 | 0 | 0 | 3.6 | .1 | 3.1 | 3.9 | | | | | | | |
| | .2 | 0 | 0 | 0 | 2.8 | .2 | 2.0 | 3.4 | | | | | | | |
| N,N-di-n-propyl-2,6-dinitro-p-anisidine. | 8 | .5 | 0 | 0 | 4 | 1.5 | 4 | 4 | 1 | 1 | 1.5 | 2.5 | 2.5 | 2 | 2.5 |
| | 4 | 1 | 0 | 0 | 4 | 1 | 4 | 4 | 1 | 1 | 1 | 3 | 2 | 1 | 2 |
| | 2 | 0 | 0 | 0 | 4 | 1 | 4 | 3 | | | | | | | |
| | 1 | 0 | 0 | 0 | 3 | .5 | 3.5 | 3 | | | | | | | |
| | .8 | 0 | 0 | 0 | 3 | 1 | 3 | 3 | | | | | | | |
| | .6 | 0 | 0 | 0 | 3 | 1 | 2 | 3 | | | | | | | |
| | .4 | 0 | 0 | 0 | 3 | 1 | 2 | 3 | | | | | | | |
| | .2 | 0 | 0 | 0 | 2 | 0 | 0 | 0 | | | | | | | |
| N,N-di-n-propyl-4-dimethylcarbamyl-2,6-dinitroaniline. | 8 | 0 | 0 | 0 | 3 | 1 | 2 | 3 | 1 | 1 | 0 | 1 | 1 | 3 | 2 |
| | 4 | 0 | 0 | 0 | 3.5 | 1.5 | 1.5 | 3 | | | | | | | |
| | 2 | 0 | 0 | 0 | 2.5 | .5 | .5 | 2.5 | | | | | | | |
| | 1 | 0 | 0 | 0 | 3 | 0 | 1 | 3 | | | | | | | |
| | .5 | 0 | 0 | 0 | 2 | 0 | 0 | 2 | | | | | | | |
| | .25 | 0 | 0 | 0 | 2 | 0 | 0 | 2 | | | | | | | |
| N,N-di-n-propyl-2,6-dinitro-m-toluidine. | 8 | 0 | 0 | 0 | 4 | 0 | 1.5 | 2.5 | .5 | .5 | .5 | .5 | 3.5 | 1.5 | 0 |
| | 4 | 0 | 0 | 0 | 2.5 | 0 | 1 | 2 | 0 | 0 | 0 | .5 | 2 | 0 | 0 |
| | 2 | 0 | 0 | 0 | 1.5 | 0 | .5 | 1 | 0 | 0 | 0 | 0 | 1.5 | 0 | 0 |
| N,N-diethyl-2,6-dinitroaniline. | 8 | 1 | 0 | .7 | 4 | 3 | 3.7 | 4 | 2.3 | 1.3 | 1.3 | 3.7 | 3 | 3 | 3 |
| | 4 | .7 | 0 | .7 | 4 | 1.3 | 2.7 | 3.7 | 1.3 | .7 | .3 | 3.7 | 3 | 3 | 2.7 |
| | 2 | .3 | 0 | .3 | 3.5 | .7 | 2.5 | 3.3 | 1.3 | .6 | .4 | 2.9 | 2.3 | 3.7 | 2.1 |
| | 1 | 0 | 0 | .3 | 1 | 0 | 0 | 1 | 0 | 0 | 0 | 1.3 | 1 | 1.3 | 1 |
| N,N-diethyl-2,6-dinitro-4-chloroaniline. | 8 | 0 | 0 | 0 | 4 | 3 | 4 | 4 | 1 | 0 | 1 | 1 | 1 | 0 | 0 |
| | 4 | 0 | 0 | 0 | 4 | 0 | 3 | 4 | 0 | 0 | 1 | 1 | 0 | 0 | 0 |
| | 2 | 0 | 0 | 0 | 3 | 0 | 1 | 3 | | | | | | | |
| | 1 | 0 | 0 | 0 | 2 | 0 | 0 | 2 | | | | | | | |

TABLE 1.—INJURY RATING—Continued

| Compound | Lb./acre | Pre-emergent Treatment | | | | | | | Post-emergent Treatment | | | | | | |
|---|---|---|---|---|---|---|---|---|---|---|---|---|---|---|---|
| | | Corn | Cotton | Soy-beans | Crab grass | Mus-tard | Pig-weed | Fox-tail | Corn | Cotton | Soy-beans | Crab grass | Mus-tard | Pig-weed | Fox-tail |
| N,N-diethyl-2,6-dinitro-p-toluidine. | 8 | 3 | 0 | 1 | 4 | 3 | 4 | 4 | 1 | 0 | 1 | 2 | 2 | 2 | 2 |
| | 4 | 0 | 0 | 0 | 4 | 3 | 4 | 4 | 1 | 0 | 1 | 2 | 1 | 1 | 2 |
| | 2 | 0 | 0 | 0 | 3 | 2 | 4 | 4 | 0 | 0 | 0 | 1 | 0 | 1 | 2 |
| | 1 | 0 | 0 | 0 | 3.3 | 1 | 2.7 | 3 | 0 | 0 | 0 | 1 | 1 | 2 | 1 |
| | .8 | 0 | 0 | 0 | 3.5 | .5 | 3 | 3 | | | | | | | |
| | .6 | 0 | 0 | 0 | 3.5 | .5 | 1.5 | 2.5 | | | | | | | |
| | .4 | 0 | 0 | 0 | 3 | .5 | .5 | 2 | | | | | | | |
| | .2 | 0 | 0 | 0 | 1 | 0 | 0 | .5 | | | | | | | |
| N,N-diethyl-2,6-dinitro-p-anisidine. | 8 | 0 | 0 | 0 | 4 | 1 | 1 | 4 | 1 | 1 | 1 | 2 | 3 | 1 | 1 |
| | 4 | 0 | 0 | 0 | 3 | 0 | 0 | 3 | 0 | 1 | 1 | 1 | 1 | 1 | 0 |
| | 2 | 0 | 0 | 0 | 3 | 0 | 0 | 2 | 0 | 0 | 0 | 1 | 1 | 0 | 0 |
| | 1 | 0 | 0 | 0 | 3 | 0 | 0 | 1 | 0 | 0 | 0 | 0 | 0 | 0 | 0 |
| N,N-diethyl-2,6-dinitro-4-trifluoro-methylaniline. | 8 | 2 | 0 | 2 | 4 | 3 | 4 | 4 | 0 | 0 | 0 | 2 | 1 | 1 | 2 |
| | 4 | 1 | 0 | 0 | 4 | 2 | 4 | 4 | 0 | 0 | 0 | 2 | 0 | 0 | 2 |
| | 2 | 1 | 0 | 0 | 3 | 1 | 4 | 4 | 0 | 0 | 0 | 1 | 0 | 0 | 1 |
| | 1 | 1 | 0 | 0 | 3 | 0 | 1.5 | 3 | 0 | 0 | 0 | 0 | 0 | 0 | 0 |
| | .8 | 0 | 0 | 0 | 1 | 0 | 1 | 2 | | | | | | | |
| | .6 | 0 | 0 | 0 | 0 | 0 | 1 | 1 | | | | | | | |
| | .4 | 0 | 0 | 0 | 1 | 0 | 0 | 0 | | | | | | | |
| N,N-di-n-butyl-2,6-dinitroaniline. | 8 | 1 | 0 | 0 | 4 | 2 | 3.5 | 4 | 2.5 | 1 | 2 | 2.5 | 2.5 | 2 | 2.5 |
| | 4 | .3 | 0 | 0 | 3.7 | .3 | 3.3 | 3.7 | 1.7 | 0 | 1.3 | 2.3 | 2 | 1.7 | 1.3 |
| | 2 | 0 | 0 | 0 | 3.7 | .3 | 3.3 | 3.7 | .7 | 0 | 1 | 2.2 | 1.3 | 1.7 | 1 |
| | 1 | 0 | 0 | 0 | 3 | 0 | 1.3 | 3 | .7 | 0 | .7 | .7 | 0 | .7 | 1 |
| N,N-di-n-butyl-2,6-dinitro-p-toluidine. | 8 | 0 | 0 | 0 | 4 | 2 | 4 | 4 | 2 | 2 | 2 | 2 | 4 | 3 | 3 |
| | 4 | 0 | 0 | 0 | 4 | 1 | 4 | 4 | 1 | 1 | 2 | 2 | 2 | 2 | 2 |
| | 2 | 0 | 0 | 0 | 2 | 1 | 2 | 3 | 1 | 1 | 1 | 1 | 1 | 1 | 1 |
| | 1 | 0 | 0 | 0 | 2.5 | .5 | 1 | 2.5 | 0 | 1 | 1 | 1 | 1 | 1 | 1 |
| | .8 | | | | 3 | 0 | 0 | 3 | | | | | | | |
| | .6 | | | | 3 | 0 | 0 | 2 | | | | | | | |
| | .4 | | | | 2 | 0 | 0 | 1 | | | | | | | |
| N,N-di-n-butyl-4-trifluoromethyl-2,6-dinitroaniline. | 8 | 0 | 0 | 0 | 4 | 3 | 4 | 4 | 0 | 0 | 1 | 2 | 1 | 0 | 1 |
| | 4 | 0 | 0 | 0 | 3 | 1 | 3 | 3 | | | | | | | |
| | 2 | 0 | 0 | 0 | 4 | 4 | 2 | 4 | | | | | | | |
| | 1 | 0 | 0 | 0 | 3 | 0 | 0 | 3 | | | | | | | |
| | .8 | | | | 3 | 0 | 0 | 2 | | | | | | | |
| | .6 | | | | 2 | 0 | 0 | 3 | | | | | | | |
| | .4 | | | | 0 | 0 | 0 | 1 | | | | | | | |
| N,N-di-n-butyl-4-chloro-2,6-dinitro-aniline. | 8 | 0 | 0 | 0 | 4 | 0 | 0 | 3 | 2 | 2 | 2 | 1 | 2 | 2 | 1 |
| | 4 | 0 | 0 | 0 | 3 | 0 | 1 | 3 | 1 | 1 | 1 | 1 | 2 | 1 | 0 |
| | 2 | 0 | 0 | 0 | 3 | 0 | 1 | 3 | 0 | 0 | 1 | 1 | 2 | 1 | 0 |
| | 1 | 0 | 0 | 0 | 3 | 0 | 0 | 2 | 0 | 0 | 0 | 1 | 1 | 1 | 0 |
| N,N-diisobutyl-4-trifluoromethyl-2,6-dinitroaniline. | 8 | 0 | 0 | 0 | 4 | 1 | 3 | 4 | 0 | 0 | 0 | 0 | 0 | 0 | 0 |
| | 4 | 0 | 0 | 0 | 4 | 1 | 2 | 4 | | | | | | | |
| | 2 | 0 | 0 | 0 | 4 | 0 | 2 | 3 | | | | | | | |
| | 1 | 0 | 0 | 0 | 3 | 0 | 0 | 3 | | | | | | | |
| N,N-di-sec.-butyl-4-trifluoromethyl-2,6-dinitroaniline. | 8 | 0 | 0 | 0 | 4 | 1 | 2 | 3 | 1 | 0 | 1 | 1 | 0 | 0 | 0 |
| | 4 | 0 | 0 | 0 | 3 | 1 | 2 | 3 | | | | | | | |
| | 2 | 0 | 0 | 0 | 1 | 0 | 1 | 2 | | | | | | | |
| N-methyl-N-n-amyl-4-trifluoromethyl-2,6-dinitroaniline. | 8 | 0 | 0 | 0 | 4 | 3 | 3 | 4 | 0 | 0 | 0 | 0 | 0 | 0 | 0 |
| | 4 | 0 | 0 | 0 | 4 | 0 | 2 | 3 | | | | | | | |
| | 2 | 0 | 0 | 0 | 3 | 0 | 0 | 3 | | | | | | | |
| N-methyl-N-n-butyl-4-trifluoromethyl-2,6-dinitroaniline. | 8 | 1 | 0 | 0 | 4 | 2 | 4 | 4 | 0 | 0 | 0 | 0 | 0 | 0 | 0 |
| | 4 | 1 | 1 | 0 | 4 | 1 | 3.5 | 3.5 | | | | | | | |
| | 2 | 0 | 0 | 0 | 3 | 0 | 2.5 | 3 | | | | | | | |
| | 1 | 0 | 0 | 0 | 3 | 0 | 2 | 2.5 | | | | | | | |
| | .5 | 0 | 0 | 0 | 3 | 0 | 1 | 3 | | | | | | | |
| | .2 | 0 | 0 | 0 | 2 | 0 | 8 | 2 | | | | | | | |
| N-ethyl-N-n-butyl-4-trifluoromethyl-2,6-dinitroaniline. | 1 | | | | 3 | 0 | 2 | 4 | | | | | | | |
| | .8 | | | | 3 | 1 | 3 | 4 | | | | | | | |
| | .6 | | | | 3 | 0 | 3 | 4 | | | | | | | |
| | .4 | | | | 3 | 0 | 2 | 4 | | | | | | | |
| | .2 | | | | 2 | 0 | 1 | 3 | | | | | | | |
| N-ethyl-N-n-propyl-4-trifluoromethyl-2,6-dinitroaniline. | 1 | | | | 4 | 1 | 4 | 4 | | | | | | | |
| | .8 | | | | 4 | 0 | 3 | 4 | | | | | | | |
| | .6 | | | | 3 | 3 | 0 | 3 | | | | | | | |
| | .4 | | | | 3 | 0 | 2 | 3 | | | | | | | |
| | .2 | | | | 2 | 0 | 0 | 2 | | | | | | | |
| N-ethyl-N-n-propyl-2,6-dinitroaniline. | 8 | .5 | 0 | 0 | 4 | 2 | 3.5 | 4 | | | | | | | |
| | 2 | 0 | 0 | 0 | 3 | 1 | 3 | 4 | | | | | | | |
| N-n-butyl-N-n-propyl-2,6-dinitroaniline. | 8 | 0 | 0 | 0 | 4 | 2 | 4 | 4 | 0 | 1 | 2 | 2 | 2 | 3 | 2 |
| | 2 | 0 | 0 | 0 | 3 | 0 | 2 | 3 | | | | | | | |
| N-methyl-N-n-propyl-2,6-dinitroaniline. | 4 | 0 | 0 | 1 | 4 | 2 | 3 | 4 | .5 | 1 | 1 | 3.5 | 2.5 | 3.5 | 2.5 |
| | 2 | 0 | 0 | .5 | 1.5 | 1 | 1 | 2.5 | 0 | 1 | 0 | 2 | 1 | 3 | 1 |
| N-ethyl-N-n-propyl-2,6-dinitro-p-toluidine. | 1 | | | | 3 | 2 | 3 | 3 | | | | | | | |
| | .8 | | | | 3 | 0 | 3 | 3 | | | | | | | |
| | .6 | | | | 3 | 0 | 2 | 3 | | | | | | | |
| | .4 | | | | 3 | 0 | 3 | 3 | | | | | | | |
| | .2 | | | | 2 | 0 | 1 | 0 | | | | | | | |
| N-ethyl-N-n-butyl-2,6-dinitro-p-toluidine. | 1 | | | | 3 | 0 | 3 | 3 | | | | | | | |
| | .8 | | | | 3 | 0 | 2 | 3 | | | | | | | |
| | .6 | | | | 3 | 0 | 3 | 3 | | | | | | | |
| | .4 | | | | 3 | 0 | 1 | 2 | | | | | | | |
| | .2 | | | | 2 | 0 | 0 | 2 | | | | | | | |

TABLE 1—INJURY RATING—Continued

| Compound | Lb./acre | Pre-emergent Treatment ||||||| Post-emergent Treatment |||||||
| | | Corn | Cotton | Soy-beans | Crab grass | Mus-tard | Pig-weed | Fox-tail | Corn | Cotton | Soy-beans | Crab grass | Mus-tard | Pig-weed | Fox-tail |
|---|---|---|---|---|---|---|---|---|---|---|---|---|---|---|---|
| N-n-propyl-N-t-butyl-2,6-dinitro-p-toluidine. | 8 | .5 | 0 | 1 | 4 | 1 | 3 | 4 | 1.5 | 3 | 1 | 4 | 3 | 3 | 3 |
| | 4 | 0 | 0 | 0 | 4 | 0 | 0 | 4 | 2 | 4 | 2 | 4 | 2 | 2 | 2 |
| | 2 | 0 | 0 | 0 | 4 | 0 | 0 | 4 | 1 | 2 | 1 | 2 | 1 | 1 | 1 |
| | 1 | 0 | 0 | 0 | 3 | 0 | 0 | 2 | 1 | 1 | 1 | 1 | 0 | 0 | 1 |
| N,N-dimethyl-4-trifluoromethyl-2,6-dinitroaniline. | 8 | 0 | 0 | 0 | 3 | 3 | 3 | 3 | 0 | 0 | 0 | 1 | 1 | 0 | 0 |
| | 4 | 0 | 0 | 0 | 3 | 1 | 1 | 3 | | | | | | | |
| | 2 | 0 | 0 | 0 | 2 | 0 | 0 | 2 | | | | | | | |
| N,N-dimethyl-4-chloro-2,6-dinitroaniline. | 8 | 0 | 0 | 0 | 4 | 3 | 2 | 4 | 0 | 0 | 1 | 2 | 3 | 2 | 1 |
| | 4 | 0 | 0 | 0 | 4 | 3 | 2 | 4 | 1 | .0 | 1 | 1 | 2 | 1 | 2 |
| | 2 | 0 | 0 | 0 | 2 | 1 | 0 | 3 | 0 | 0 | 1 | 1 | 1 | 1 | 0 |
| N,N-dimethyl-2,6-dinitro-p-toluidine. | 8 | 0 | 0 | 0 | 3.5 | 4 | 3.5 | 3.5 | 1 | 1 | 1 | 3 | 1 | 1 | 1 |
| | 4 | 0 | 0 | 0 | 2 | 2 | 2 | 2 | | | | | | | |
| N-allyl-N-methyl-4-trifluoromethyl-2,6-dinitroaniline. | 8 | 1 | 0 | 0 | 4 | 2 | 3 | 4 | 0 | 0 | 0 | 1 | 0 | 0 | 0 |
| | 4 | 0 | 0 | 0 | 4 | 0 | 2 | 4 | | | | | | | |
| | 2 | 0 | 0 | 0 | 3 | 0 | .1 | 3 | | | | | | | |
| N-allyl-N-ethyl-4-trifluoromethyl-2,6-dinitroaniline. | 8 | 0 | 0 | 1 | 4 | 3 | 4 | 4 | 0 | 0 | 0 | 1 | 0 | 0 | 0 |
| | 4 | .5 | 0 | 0 | 4 | 2 | 4 | 4 | | | | | | | |
| | 2 | .5 | 0 | 0 | 4 | 2 | 3 | 4 | | | | | | | |
| | 1 | 0 | 0 | 0 | 3.7 | .3 | 2.7 | 3.3 | | | | | | | |
| | .8 | | | | 4 | 1 | 4 | 4 | | | | | | | |
| | .6 | | | | 3 | 1 | 2 | 3 | | | | | | | |
| | .5 | 0 | 0 | 0 | 3 | 0 | 2 | 3 | | | | | | | |
| | .4 | | | | 3 | 1 | 2 | 3 | | | | | | | |
| | .2 | 0 | 0 | 0 | 1 | 0 | .5 | 2 | | | | | | | |
| N-allyl-N-ethyl-2,6-dinitro-p-toluidine. | 1 | | | | 3 | 0 | 2 | 3 | | | | | | | |
| | .8 | | | | 3 | 0 | 3 | 3 | | | | | | | |
| | .6 | | | | 3 | 0 | 2 | 3 | | | | | | | |
| | .4 | | | | 2 | 0 | 1 | 2 | | | | | | | |
| | .2 | | | | 2 | 0 | 0 | 1 | | | | | | | |
| N,N-diallyl-2,6-dinitroaniline. | 8 | .2 | .4 | .2 | 3.8 | 2.8 | 3.4 | 3.8 | | | | | | | |
| | 4 | 0 | 0 | 0 | 3.8 | 2.5 | 2.8 | 3.5 | 1 | 1 | 1 | 3 | 1 | 2 | 2 |
| | 2 | 0 | 0 | 0 | 2.3 | .3 | .8 | 3.3 | 1 | 1 | 1 | 1.5 | 1 | 2 | 1 |
| | 1 | 0 | 0 | 0 | 2.5 | 0 | 0 | 3 | 0 | 0 | 0 | 1 | 0 | 1 | 1 |
| N,N-diallyl-4-trifluoromethyl-2,6-dinitroaniline. | 8 | 3 | 0 | 0 | 4 | 2 | 4 | 4 | 0 | 0 | 0 | 1 | 1 | 0 | 1 |
| | 4 | 2 | 0 | 0 | 4 | 1 | 4 | 4 | | | | | | | |
| | 2 | 1 | 0 | 0 | 4 | 1 | 4 | 4 | | | | | | | |
| | 1 | .3 | 0 | 0 | 3.5 | .3 | 3.3 | 3.5 | | | | | | | |
| | .8 | 0 | 0 | 0 | 3.7 | 0 | 2.7 | 3.3 | | | | | | | |
| | .6 | 0 | 0 | 0 | 3.3 | .3 | 2.3 | 3 | | | | | | | |
| | .4 | 0 | 0 | 0 | 2.7 | 0 | 2.3 | 2.7 | | | | | | | |
| | .2 | 0 | 0 | 0 | 2 | 0 | 1.3 | 2.3 | | | | | | | |
| N,N-diallyl-4-methyl-2,6-dinitroaniline. | 1.0 | | | | 3 | 0 | 2 | 3 | | | | | | | |
| | .8 | | | | 3 | 0 | 3 | 3 | | | | | | | |
| | .6 | | | | 3 | 0 | 1 | 3 | | | | | | | |
| | .4 | | | | 3 | 0 | 1 | 2 | | | | | | | |
| N-methyl-N-3-chloroallyl-4-trifluoro-methyl-2,6-dinitroaniline. | 8 | 2 | 1 | 0 | 4 | 2 | 4 | 4 | 0 | 0 | 0 | 2 | 2 | 2 | 0 |
| N,N-dipropargyl-4-trifluoromethy-2,6-dinitroaniline. | 8 | 0 | 0 | 0 | 4 | 1 | 4 | 4 | 0 | 1 | 1 | 3 | 2 | 4 | 1 |
| | 4 | 0 | 0 | 0 | 3 | 0 | 3 | 3 | 0 | 0 | 1 | 2 | 1 | 1 | 0 |
| | 1 | 0 | 0 | 0 | 2 | 0 | 1 | 2 | | | | | | | |
| N-(2,6-dinitrophenyl)pyrrolidine. | 8 | 0 | 0 | 0 | 4 | 0 | .5 | 3 | 1 | 1 | 1 | 2.5 | 1.5 | 1.5 | 2 |
| | 4 | 0 | 0 | 0 | 4 | 0 | 2 | 2 | 1 | 1 | 0 | 2 | 2 | 1 | 1 |
| | 2 | 0 | 0 | 0 | 3 | 0 | 1 | 1 | 1 | 1 | 0 | 2 | 1 | 1 | 1 |
| N-(4-trifluoromethyl-2,6-dinitrophenyl)pyrrolidine. | 8 | 2 | .5 | 0 | 4 | 1 | 4 | 3.5 | 1 | 0 | 0 | 1 | 2 | 0 | 1 |
| | 4 | 1 | 0 | 0 | 4 | 1 | 4 | 4 | | | | | | | |
| | 2 | 0 | 0 | 0 | 4 | 1 | 4 | 4 | | | | | | | |
| | 1 | 0 | 0 | 0 | 3 | 0 | 0 | 3 | | | | | | | |
| N-(4-chloro-2,6-dinitrophenyl)pyrrolidine. | 8 | 0 | 0 | 0 | 4 | 1 | 1 | 4 | 0 | 0 | 1 | 2 | 1.5 | 1 | 2 |
| | 4 | 0 | 0 | 0 | 3 | 1 | 1 | 4 | 0 | 0 | 0 | 1 | 1 | 2 | 1 |
| | 2 | 0 | 0 | 0 | 3 | 0 | 0 | 3 | 0 | 0 | 0 | 0 | 1 | 1 | 0 |
| | 1 | 0 | 0 | 0 | 2 | 0 | 0 | 1 | 0 | 0 | 0 | 0 | 1 | 1 | 0 |
| N-(4-methyl-2,6-dinitrophenyl)pyrrolidine. | 8 | .5 | 0 | 0 | 4 | 2.5 | 3.5 | 4 | .5 | .5 | 1 | 2 | 2 | 2 | 2.5 |
| | 4 | 0 | 0 | 0 | 4 | 0 | 2 | 4 | 1 | 0 | 0 | 2 | 2 | 2 | 2 |
| | 2 | 0 | 0 | 0 | 3 | 0 | 1 | 3 | 1 | 0 | 0 | 2 | 0 | 2 | 2 |
| | 1 | 0 | 0 | 0 | 3 | 0 | 1 | 3 | 0 | 0 | 0 | 1 | 0 | 0 | 0 |
| N-(2,6-dinitrophenyl)-piperidine. | 8 | 0 | 0 | 0 | 3 | .5 | 4 | 4 | 1.5 | 1 | 1.5 | 3 | 2.5 | 2 | 1.5 |
| | 4 | 0 | 0 | 0 | 3 | 1 | 2 | 3 | 2 | 1 | 2 | 3 | 2 | 1 | 1 |
| N-(4-trifluoromethyl-2,6-dinitrophenyl)piperidine. | 8 | 0 | 0 | 0 | 4 | 1 | 4 | 4 | 0 | 0 | 0 | 1 | 1 | 0 | 0 |
| | 4 | 0 | 0 | 0 | 4 | 1 | 4 | 4 | | | | | | | |
| | 2 | 0 | 0 | 0 | 3 | 1 | 3 | 3 | | | | | | | |
| | 1 | 0 | 0 | 0 | 3 | 0 | 3 | 3 | | | | | | | |
| N-methyl-N-(2,2-dimethoxyethyl)4-trifluoromethyl-2,6-dinitroaniline. | 8 | 0 | 0 | 1 | 4 | 3 | 3 | 4 | 0 | 0 | 0 | 2 | 1 | 1 | 1 |
| | 4 | .5 | 0 | 0 | 3 | 1.5 | 3.5 | 4 | | | | | | | |
| | 2 | .5 | 0 | 0 | 3.5 | .5 | 2.5 | 3 | | | | | | | |
| | 1 | 0 | 0 | 0 | 3 | .5 | 1.5 | 3 | | | | | | | |
| | .5 | 0 | 0 | 0 | 1 | 0 | 0 | 3 | | | | | | | |
| | .2 | 0 | 0 | 0 | 1 | 0 | 0 | 1 | | | | | | | |
| N-ethyl-N-(2-methoxyethyl)4-trifluoromethyl-2,6-dinitroaniline. | 8 | 3 | 1 | 1 | 4 | 3 | 4 | 4 | | | | | | | |
| | 4 | 3 | 1 | 1 | 4 | 2 | 4 | 4 | | | | | | | |
| | 2 | 3 | 0 | 0 | 4 | 1 | 4 | 4 | | | | | | | |
| | 1 | 0 | 0 | 0 | 4 | 0 | 4 | 3 | | | | | | | |

TABLE 1—INJURY RATING—Continued

| Compound | Lb./acre | Pre-emergent Treatment | | | | | | | Post-emergent Treatment | | | | | | |
|---|---|---|---|---|---|---|---|---|---|---|---|---|---|---|---|
| | | Corn | Cotton | Soy-beans | Crab grass | Mus-tard | Pig-weed | Fox-tail | Corn | Cotton | Soy-beans | Crab grass | Mus-tard | Pig-weed | Fox-tail |
| N-n-propyl-N-(3-methoxy-propyl) 4-trifluoromethyl-2,6-dinitroaniline. | 8 | 3 | 0 | 1 | 4 | 3 | 4 | 4 | | | | | | | |
| | 4 | 2 | 0 | 0 | 4 | 2 | 4 | 4 | | | | | | | |
| | 2 | 2 | 0 | 0 | 4 | 0 | 4 | 4 | | | | | | | |
| | 1 | 1 | 0 | 0 | 4 | 0 | 4 | 4 | | | | | | | |
| N,n-propyl-N(2,2-diethoxy-ethyl) 4-trifluoromethyl-2,6-dinitroaniline. | 8 | .5 | 0 | 0 | 3.5 | 1 | 2 | 3.5 | 0 | 1 | 0 | 1 | 2 | 1 | 0 |
| | 4 | 0 | 0 | 0 | 2 | 1 | 1 | 3 | | | | | | | |
| | 2 | 0 | 0 | 0 | 1 | 0 | 0 | 1 | | | | | | | |

According to Table 1 above, the compounds which are the most active in killing germinating and seedling weed grasses and broadleaf weeds are those in which $R_1$ in the above formula is a trifluoromethyl group present in the position in the benzene ring para to the amine group. Exemplary of these compounds is N,N-di-n-propyl-4-trifluoromethyl-2,6-dinitroaniline, to be referred to hereinafter by its generic name trifluralin. In the greenhouse, trifluralin will eliminate in excess of 80 percent of seedling weed grasses and broadleaf weeds such as pigweed in the seedling stage at application rates of about 0.5 lb. per acre and shows no appreciable damage to established plants except crabgrass at rates as high as 8 lbs. per acre. In the field, trifluralin can be applied at rates of 1 to 16 lbs. per acre by spraying and at rates of from .25 to 5 lbs. per acre by soil incorporation. The application rate depends on the type of soil to be treated, sandy soils requiring less herbicide, and heavy clay soils, relatively more herbicide. At these rates of application, very few broadleaf plant species are damaged by the application of trifluralin. Other excellent herbicidal compounds having a trifluoromethyl group para to the amine nitrogen include N-n-butyl-N-ethyl 4-trifluoromethyl-2,6-dinitroaniline and N-ethyl-N-n-propyl 4-trifluoromethyl-2,6-dinitroaniline.

Another group of compounds which are quite active in killing germinating and seedling weed grasses and broadleaf weeds are those in which $R_1$ in the above formulas is lower alkyl. Exemplary of such compounds is N,N-di-n-propyl 2,6-dinitro-p-toluidine, to be known hereinafter by its generic name, dipropalin. While dipropalin is quite active against a broad spectrum of weeds, including pigweed, large crabgrass, German millet, yellow foxtail, annual bluegrass, and small crabgrass, trifluralin has an acceptable herbicidal action at low concentrations not shared by dipropalin. This greater effectiveness of trifluralin is not as noticeable shortly after the application of the herbicidal compound to an area infested with seeds, germinating seeds, seedlings, and mature plants of the above six species. However, at later observation periods, a marked difference in effectiveness is seen with plants in the trifluralin-treated areas continuing to show damage of the same order as originally seen whereas plants in the dipropalin-treated area which were not killed outright had begun to recover, at least in part, from the deleterious effect of the compound. The same generalization holds true for other pairs of compounds in which the substituents on the aniline nitrogen are identical and which differ only in the presence of a trifluoromethyl or methyl group para to the nitrogen.

Both trifluralin and dipropalin have been extensively tested for their propensity to damage crops. Table 2 which follows lists the highest rate at which either dipropalin or trifluralin was applied by spray to various crop plants in the field without damage to the crop. In carrying out these tests, trifluralin and dipropalin were sprayed on test plot areas at rates varying from 2 to 8 lbs. per acre for trifluralin and at 4 and 8 lbs. per acre for dipropalin. The treated areas were then seeded to each of the plants listed in the table. The crops were examined visually for damage one month and two months after planting. In Table 2, column 1 lists the name of the plant, column 2 the highest application rate for trifluralin at which no damage to the crop plant of column 1 was seen two months after planting, and column 3 gives the same information for dipropalin.

TABLE 2.—PRE-EMERGENT TESTING AGAINST CROP PLANTS IN THE FIELD

| Crop Species and Variety | Trifluralin, lb. per acre | Dipropalin, lb. per acre |
|---|---|---|
| Bean, Blue Lake | 8 | 8 |
| Bean, Contender | 8 | 8 |
| Bean, Fordhook 242 | 8 | 8 |
| Bean, White Navy | 8 | 8 |
| Peas, Laxton's Progress | 6 | 8 |
| Swiss Chard, Lucullus | 2 | 8 |
| Okra, Clemson Spineless | 6 | 8 |
| Spinach, American | 2 | |
| Brussel Sprouts, Long Island | 8 | 8 |
| Broccoli, DeCicco | 8 | 8 |
| Collards, Georgia | 8 | 8 |
| Cabbage, Earliana | 8 | 8 |
| Kohlrabi, Purple Vienna | 8 | 8 |
| Mustard, Florida Broadleaf | 8 | 8 |
| Rape, Dwarf Essex | 8 | 8 |
| Rutabaga, American Purple Top | 8 | 8 |
| Turnip, Purple Top | 8 | 8 |
| Radish, Early Scarlet Globe | 8 | 8 |
| Cucumber, Straight Eight | 8 | 8 |
| Cantaloupe, Honey Rock | 8 | 8 |
| Pumpkin, Connecticut Field | 8 | 8 |
| Watermelon, Charleston Gray | 8 | 8 |
| Squash, Early Prolific Straightneck | 4 | 4 |
| Pepper, California Wonder | 8 | 8 |
| Tomato, Pritchard | 2 | 4 |
| Cauliflower, Early Snowball | 8 | 8 |
| Kale, Dwarf Green | 8 | 8 |
| Carrot, Chantenay | 4 | 8 |
| Parsnip, All American | 4 | 8 |
| Asparagus, Mary Washington | 4 | |
| Sweet Corn, Golden Cross Bantam | 8 | |

Trifluralin and dipropalin were also applied post-emergent in the field to the above crops as a spray prepared from an emulsifiable concentrate containing 4 lbs. of active ingredient per gallon. In this test, garden plots were seeded to each of the species and the trifluralin or dipropalin applied about one month after planting. One month after spraying, visual observation was made of the amount of damage caused by each of the compounds to the particular crop. Each of the crops listed in Table 2 above were tolerant to 8 lbs. per acre of trifluralin and 4 lbs. per acre of dipropalin except for okra and cauliflower which were undamaged by 4 lbs. per acre of trifluralin, but showed slight damage at 8 lbs. per acre.

In addition to the crops listed in Table 2, it was found in a similar test that Detroit dark red beets tolerated 4 lbs. per acre of trifluralin and 4 lbs. per acre of dipropalin and Bermuda onions tolerated 8 lbs. per acre of trifluralin and 4 lbs. per acre of dipropalin.

Trifluralin has also been used for the selective preemergent control of seedling grass weeds and selected broadleaf weeds in ornamental flower beds, around shrub plants, in rose gardens, and in ground covers at rates sufficiently high to control the weed population without damage to the established plants. Among the broadleaf weeds which were controlled under these conditions were the following: carpetweed, chickweed, lamb's-quarters, pigweed, purslane, Venice mallow, knotweed, and smartweed. In these experiments, trifluralin was applied at the rate of about 5 lbs. per acre. Previous greenhouse test results indicated that there was little possibility of damaging any of the ornamental plants or shrubs at this application rate. The amount of trifluralin applied here was greatly in excess of that needed for immediate control of crabgrass in the particular area but the added amount provided full season protection against seedling grasses in all soil types. Table 3 which follows lists ornamental plants found to be tolerant to 5 lbs. per acre of trifluralin. In the table, column 1 gives the genus to which the plant belongs, column 2 the common name of the plant, and column 3 the number of varieties of the plant is subjected to test. Many of the plants in Table 3 were not injured by the application of trifluralin as high as 20 lbs. per acre.

TABLE 3

SHRUBS AND TREES

| Genus | Common Name | Number Varieties Tested |
|---|---|---|
| Acer | Maple | 5 |
| Betula | Birch | 1 |
| Berberis | Barberry | 1 |
| Buxus | Boxwood | 2 |
| Camellia | Camellia | 2 |
| Cercis | Redbud | 1 |
| Cleyera | | 1 |
| Cornus | Dogwood | 1 |
| Cotoneaster | Cotoneaster | 2 |
| Eleagnus | | 1 |
| Euonymus | Euonymus | 2 |
| Gleditsa | Locust | 1 |
| Ilex | Holly | 4 |
| Juniperus | Juniper | 5 |
| Ligustrum | Privet | 3 |
| Liquidambar | Sweet Gum | 1 |
| Liriodendron | Tulip Tree | 1 |
| Malus | Crab Apple | 1 |
| Nyssa | Sour Gum | 1 |
| Philadelphus | Mock Orange | 1 |
| Picea | Spruce | 3 |
| Pinus | Pine | 1 |
| Pittosporum | | 1 |
| Podocarpus | | 1 |
| Prunus | Cherry | 1 |
| Pseudotsuga | Douglas Fir | 1 |
| Pyracantha | Firebush | 1 |
| Querus | Oak | 3 |
| Rhaphiolepsis | | 1 |
| Taxus | Yew | 5 |
| Thuja | Arbor-Vitae | 2 |
| Viburnum | | 3 |
| Weigela | Weigela | 1 |

BULBS AND PERENNIAL FLOWERING PLANTS

| | | |
|---|---|---|
| Gladiolus | Gladiolus | 2 |
| Paeonia | Peonies | 4 |
| Phlox | Phlox | 4 |
| Hedera | Ivy | |
| Euonymus | Wintercreeper | |
| Vinca minor | Myrtle | |

ROSES

| | | |
|---|---|---|
| Variety Name: | | |
| Poinsettia | | |
| Crimson Glory | | |
| Red Radiance | | |
| Peace | | |
| Unspecified | | |

ANNUAL FLOWERS

| Common Name: | | |
|---|---|---|
| Achillea | | 1 |
| Ageratum | | 1 |
| Anchusa | | 1 |
| Arctotis | | 1 |
| Aster | | 1 |
| Balsam | | 1 |
| Calendula | | 1 |
| Calliopsis | | 2 |
| Centaurea | | 1 |
| Cosmos | | 2 |
| Cypress Vine | | 1 |
| Dahlia | | 1 |
| Dianthus | | 1 |
| Dimorphotheca | | 1 |
| Forget-me-not | | 1 |
| Four O'Clock | | 1 |
| Gaillardia | | 1 |
| Gypsophila | | 1 |
| Hollyhock | | 1 |
| Linaria | | 1 |
| Lupine | | 1 |
| Marigold | | 2 |
| Mignonette | | 1 |
| Morning Glory | | 1 |
| Nasturtium | | 1 |
| Nicotiana | | 1 |
| Periwinkle | | 1 |
| Petunia | | 2 |
| Portulaca | | 1 |
| Rutbeckia | | 1 |
| Scabiosa | | 1 |
| Shasta Daisy | | 1 |
| Snapdragon | | 1 |
| Stocks | | 1 |
| Snow on the Mountain. | | 1 |
| Statice | | 1 |
| Sunflower | | 1 |
| Sweet Alyssum | | 1 |
| Sweet Pea | | 1 |
| Sweet William | | 1 |
| Zinnia | | 2 |

Trifluralin has also been extensively employed as a pre-emergent herbicide in lawns throughout the different areas in the United States. The recommended application rate has been 1.5 lbs. per acre in a dry spreadable formulation and 2 lbs. per acre in a spray formulation. When applied at the rate of 1.5 lbs. per acre as a 0.3 to 2 percent formulation on a vermiculite or fertilizer carrier, trifluralin was found to kill completely the following germinating and seedling grasses: cheat, goosegrass, barnyardgrass, stinkgrass, fall panicum, large crabgrass, smooth crabgrass, foxtail, annual bluegrass, dallis grass, and rough bluegrass. In actual use, trifluralin can be applied to a bluegrass lawn anytime in the spring and when thus applied, will kill any germinating weed grass seeds or seedling grasses as long as the compounds persist in the upper soil layer in a herbicidal concentration.

The lack of toxicity of trifluralin, one of the compounds represented by the above formula, for turfs was established by the application of the compound to Bermuda grass or Kentucky bluegrass turfs at rates as high as 10 lbs. per acre under favorable weather conditions without any perceptible damage to the turf. Trifluralin was also applied to other turfs including those of zoysia, St. Augustine grass and Merion bluegrass in a dry formulation, at rates at which seedling weed grasses were killed, without damage to the turf under most weather and soil conditions.

Trifluralin has also been extensively tested in the field for its ability to control grass weeds in planted soybean fields. Trifluralin was applied to these fields at rates varying from 1–6 lbs. per acre as a spray applied at planting time. When applied in this way, trifluralin eliminated from 93–99+ percent of the grass weeds, from 56–96 percent of pigweed and smartweed and from 38–78 percent of ragweed seeded to the area at the same time as the soybeans. No damage to the soybeans was seen. A similar field trial was carried out with trifluralin being incorporated into the soil by various methods at the time of application. The weed control was much better than in the previous field trial (without incorporation), but slight damage to the soybean plants was seen at the highest application rate. In another test employing both dipropalin and trifluralin, neither compound damaged soybeans when incorporated into the soil at the time of planting at rates varying from ¼ to 4 lbs. per acre. Essentially the same results were obtained when the compounds were applied to the test area as a solid formulation (for example, a 5 percent formulation on attapulgite). In another field trial, this time with trifluralin alone, incorporation of the compound into the soil at the time of planting of the soybeans, after application to the area by spraying at rates varying from 0.5–4 lbs. per acre, gave 100 percent control of crabgrass in most test plots at all application rates, the same for pigweed, and control of purslane in excess of 90 percent on the average.

Trifluralin has also been used successfully for the control of seedling grasses and of broadleaf weeds in peanut fields. The compound was applied as a pre-emergent herbicide broadcast to the area to be planted in peanuts. Based upon the results, the following are the recommended application rates for trifluralin to peanut fields. When soil incorporation of trifluralin is to be carried out using a rotovator or power-driven rotary hoe, the recommended rate of application to peanut fields is .5–.75 lb. per acre on sandy or loamy soil and .75–1 lb. per acre on silty clay or clay soil. If trifluralin is to be applied to the peanut field as a spray only, without soil incorporation, the recommended rates of application are 4 lbs. per acre on sand and loamy soils and 6 lbs. per acre on silty clay loam and clay soils. At these rates of application, there was little or no damage to the peanut plants while the control of grass seedlings and susceptible broadleaf weeds varied from 99–100 percent and 90–100 percent, respectively.

Seedling grasses and susceptible broadleaf weeds can also be controlled in cotton fields by the application thereto of trifluralin as a pre-emergent herbicide applied either in-row or broadcast at the following rates: When trifluralin is to be incorporated into the soil, .5–.75 lb. per acre on sand, 1–1.5 lbs. per acre on loam and 1.5–2 lbs. per acre on silty clay loam or clay soil; when a spray application is to be used, 4 lbs. per acre on sand and loamy soil, and 6 lbs. per acre on silty clay loam or clay soils. In numerous field trials at the recommended rates of application of trifluralin, the control of grass weeds varied from 92–100 percent and the control of broadleaf weeds from 60–100 percent without any damage to the cotton crop being perceived. Trifluralin can also be applied post-emergent to cotton as a lay-by treatment.

In addition, trifluralin has been used successfully to control weeds in tobacco plantings. The compound can be applied to the soil during the transplanting of tobacco seedlings. The rates of application are essentially the same as those recommended for cotton and peanuts in the above paragraphs.

The N,N-di-substituted-2,6-dinitroanilines represented by the above formula can be formulated in a variety of ways for application to soil areas. Among these herbicidal formulations are included wettable powders, emulsifible concentrates, and solid formulations on selected carriers. The N,N-di-substituted-2,6-dinitroaniline formulations can also include other herbicides (for killing mature grasses and dicotyledenous plants), insecticides, miticides, etc. Typical formulations are set forth below using trifluralin as the active ingredient for illustrative purposes only.

*Formulation 1.—Solid formulation on vermiculite*

The following ingredients were dissolved in an aromatic naphtha solvent extended with mineral spirits and the solution was applied to vermiculite so as to give a formulation having the following percentages of active ingredients by weight:

| | Percent |
|---|---|
| Trifluralin | .29 |
| 2,4-dichlorophenoxyacetic acid, iso-octyl ester | 1.4 |
| 2,4,5-trichlorophenoxyacetic acid, iso-octyl ester | .67 |

Sufficient disodium methylarsonate hexahydrate dust was blended with the vermiculite to give a concentration of 4 percent.

*Formulation 2.—Solid formulation on fertilizer*

The active ingredients were dissolved in an aromatic naphtha solvent and deposited upon a 4–12–4 fertilizer to give a dry spreadable formulation having the following active ingredients in percentage by weight.

| | Percent |
|---|---|
| Trifluralin | .184 |
| Heptachlor and related compounds | .125 |

*Formulation 3.—Spreadable formulation on lawn-type fertilizer*

The following ingredients were dissolved in an aromatic naphtha solvent and deposited on a 10–5–5 fertilizer to give a spreadable formulation having the following active ingredients in percentage by weight.

| | Percent |
|---|---|
| Trifluralin | .092 |
| Heptachlor and related compounds | .59 |

In addition, sufficient diphenylacetonitrile was melted on the fertilizer to give a final concentration of 4.6 percent.

*Formulation 4.—Solution concentrate*

A solution concentrate was prepared containing the following active ingredients in percentages by weight.

| | Percent |
|---|---|
| Trifluralin | 1.54 |
| Disodium methylarsonate hexahydrate | 4.5 |
| 2,4-dichlorophenoxyacetic acid, iso-octyl ester | 1.74 |
| 2,4,5-trichlorophenoxyacetic acid, iso-octyl ester | 0.55 |

Four and two-tenths percent of a nonylphenoxy polyoxyethylene ethanol was added as an emulsifier. The recommended rate of dilution for this product is four tablespoons to one gallon of water.

Other typical formulations are listed below in terms of total content of trifluralin and inert ingredients.

A. Granular formulations:

1.
12.5% trifluralin
13.0–15.0% methylated naphthalene solvent
74.5–72.5% attapulgite clay granules 2.
5.0% trifluralin
6.0% methylated naphthalene solvent
89.0% attapulgite clay granules 3.
1.0–2.0% trifluralin
1.0–3.0% aromatic naphtha solvent
95.0–98.0% No. 4 vermiculite 4.
0.5% trifluralin
4.5% aromatic naphtha solvent
95.0% granular diatomaceous earth 5.
1.0–2.0% trifluralin
0.5–3.5% aromatic naphtha solvent
94.5–98.5% corncob grit B. Liquid concentrate formulations:

1.
35.0–37.5% trifluralin
2.5–5.0% emulsifier
57.0–61.5% xylene solvent 2.
46.0–49.0% trifluralin
3.5–5.0% emulsifier
46.0–49.5% xylene solvent

3.

69.0–75.0% of 60–69% trifluralin solution in aromatic naphtha solvent
7.0% emulsifier
18.5–25.0% xylene solvent In the above liquid formulations, the emulsifier can be any suitable anionic or non-ionic surfactant or a mixture of these two types of surfactants. Typical of the latter are blends containing three parts of the calcium salt of myristylbenzene sulfonic acid to one part of the oleate ester of a polyoxyethylene glycol (M.W.=350) or seven parts of the calcium salt of laurylphenolsulfonic acid to three parts of mono- and di-resin acid esters of polyoxyethylene glycol (M.W.=500). Other non-ionic surfactants which are commonly blended with the anionic surfactants listed above include polyoxyethylene sorbitan monolaurate. A particularly useful emulsifier combination for use in the liquid formulation No. 3 above includes 2.1% of an alkylarylsulfonate and 4.9% of an anionic non-ionic surfactant mixture containing a magnesium salt of a cetylphenolsulfonic acid and a mono- and di-resin acid ester of a polyoxyethylene glycol (M.W.=400). Other suitable emulsifiers will readily suggest themselves to those skilled in the art.

The N,N-di-substituted-2,6-dinitroanilines provided by this invention are either low-melting, yellow, crystalline solids or heavy, orange-colored, viscous oils. They are readily prepared by heating 2,6-dinitrochlorobenzene or a substituted 2,6-dinitrochlorobenzene with a secondary amine in an inert solvent. For example, N,N-di-n-propyl 2,6-dinitroaniline is prepared by reacting 2,6-dinitrochlorobenzene with an excess of di-n-propylamine in a suitable nonreacting solvent such as benzene or ethanol. Hydrogen chloride produced as a by-product in the reaction is immediately picked up by the excess di-n-propylamine present, thus forming di-n-propylamine hydrochloride. If a nonpolar organic solvent such as benzene is used in which the hydrochloride salt is insoluble, the salt can be separated by filtration and the desired N,N-di-n-propyl 2,6-dinitroaniline is recovered by evaporation of the filtrate. If a polar organic solvent such as ethanol is used in which the hydrochloride salt is soluble, the reaction mixture is evaporated to dryness and the residue treated with a mixture of water and ether. The hydrochloride salt dissolves in the water and N,N-di-n-propyl 2,6-dinitroaniline is extracted into the ether layer and recovered by evaporation of the ether. Compounds having a substituent in the 4 position of the aniline ring such as N,N-di-n-propyl 4-chloro-2,6-dinitroaniline and N,N-di-n-propyl 2,6-dinitro-p-toluidine are prepared in a similar fashion by employing as starting materials 2,6-dinitro-1,4-dichlorobenzene or 3,5-dinitro-4-chlorotoluene respectively in place of 2,6-dinitrochlorobenzene in the above synthetic procedure.

This invention is further illustrated by the following specific examples:

EXAMPLE 1.—PREPARATION OF N,N-DI-n-PROPYL 2,6-DINITROANILINE

A solution containing 0.1 m. (mole) of di-n-propylamine and 100 ml. of benzene was added to a solution containing 0.05 m. of 2,6-dinitrochlorobenzene in 100 ml. of benzene. The reaction mixture was heated to refluxing temperature for about one-half hour, at which time a crystalline precipitate of di-n-propylamine hydrochloride had formed. The reaction mixture was filtered to remove those crystals and the filtrate was again heated to refluxing temperature for about 15 minutes. The benzene and excess amine were removed by evaporation in vacuo. The residue comprising N,N-di-n-propyl 2,6-dinitroaniline was crystallized and recrystallized from ethanol. M.P.=50–52° C. Analysis.—Calc.: N, 15.72. Found: N, 15.52.

Following the above procedure N-methyl n-propylamine was reacted with 2,6-dinitrochlorobenzene to yield N-methyl-N-n-propyl 2,6-dinitroaniline which melted at about 44–45° C. Analysis.—Calc.: N, 17.56. Found: N, 17.51.

EXAMPLE 2.—PREPARATION OF N,N-DIETHYL 2,6-DINITROANILINE

Following the procedure of Example 1, a benzene solution containing 2 g. of 2,6-dinitrochlorobenzene and a benzene solution containing an excess of diethylamine were heated to refluxing temperature for about one-half hour. The diethylamine hydrochloride formed as a by-product in the reaction was removed by filtration and the filtrate was again heated to refluxing temperature for about 15 minutes. Evaporation of the solvent and excess amine in vacuo yielded an orange-colored residue comprising N,N-diethyl 2,6-dinitroaniline which was recrystallized from alcohol. N,N-diethyl 2,6-dinitroaniline thus prepared melted at about 46–48° C. Analysis.—Calc.: N, 17.56. Found N, 17.63.

EXAMPLE 3.—PREPARATION OF N,N-DI-n-BUTYL 2,6-DINITROANILINE

Following the procedure of Example 1, 2,6-dinitrochlorobenzene and di-n-butylamine were reacted in benzene solution to prepare N,N-di-n-butyl 2,6-dinitroaniline. The compound was isolated by the procedure of Example 1. Attempted crystallization of the isolated material from ethanol indicated that N,N-di-n-butyl 2,6-dinitroaniline has a melting point below ambient room temperature. Analysis.—Calc.: N, 14.25. Found: N, 14.51.

EXAMPLE 4.—PREPARATION OF N-(2,6-DINITROPHENYL)-PIPERIDINE

Following the procedure of Example 1, 2,6-dinitrochlorobenzene and piperidine were reacted in benzene solution to produce N - (2,6 - dinitrophenyl) - piperdine which melted at about 72–75° C. after two recrystallizations from ethanol. Analysis.—Calc.: N, 16.74. Found: N, 16.62.

EXAMPLE 5.—PREPARATION OF N-(2,6-DINITROPHENYL)-PYRROLIDINE

Following the procedure of Example 1, pyrrolidine and 2,6-dinitrochlorobenzene were reacted in benzene solution. N-(2,6-dinitrophenyl)-pyrrolidine thus formed was isolated by the procedure of Example 1 and melted at about 109–112° C. after a two-fold recrystallization from ethanol. Analysis.—Calc.: N, 17.72. Found: N, 17.55.

EXAMPLE 6.—PREPARATION OF N,N-DI-ALLYL 2,6-DINITROANILINE

Following the procedure of Example 1, 2,6-dinitrochlorobenzene and di-allylamine were reacted in benzene solution. N,N-di-allyl 2,6-dinitroaniline thus formed was isolated by the procedure of Example 1. The compound melted at about 50.5–52° C. after a two-fold recrystallization from aqueous ethanol. Analysis.—Calc.: N, 15.96; C, 54.75; H, 4.98. Found: N, 15.03; C, 54.55; H, 4.99.

EXAMPLE 7.—PREPARATION OF N,N-DI-n-PROPYL 4-CHLORO-2,6-DINITROANILINE

Following the procedure of Example 1, 0.05 m. of di-n-propylamine and 0.02 m. of 1,4-dichloro-2,6-dinitrobenzene [prepared by the method of Ullmann and Sané, Berichte 44, 3731 (1911)] in 50 ml. of xylene were heated at 100° C. for about 72 hours. Di-n-propylamine hydrochloride was removed by filtration, and the filtrate containing N,N-di-n-propyl 4-chloro-2,6-dinitroaniline formed in the above reaction was evaporated to dryness. Recrystallization of the residue from ethanol yielded N,N-di-n-propyl 4-chloro-2,6-dinitroaniline melting at about 70–71° C. Analysis.—Calc.: N, 13.93. Found: N, 14.17.

Following the above procedure pyrrolidine was reacted with 1,4-dichloro-2,6-dinitrobenzene to yield N-(4-chloro-2,6-dinitrophenyl)-pyrrolidine which melted at about 96–99° C. Analysis.—Calc.: N, 15.46. Found: N, 14.79.

EXAMPLE 8.—PREPARATION OF N,N-DI-n-PROPYL 2,6-DINITRO-p-TOLUIDINE

A solution containing 3.5 g. of 4-chloro-3,5-dinitrotoluene and 10 ml. of di-n-propylamine was heated at about 100° C. for about 16 hours. The reaction mixture was extracted with ether, leaving an ether-insoluble residue of di-n-propylamine hydrochloride. The ether extract was evaporated to dryness, and the residue containing N,N-di-n-propyl 2,6-dinitro-p-toluidine was recrystallized from hexane. The product melted at about 40–42° C. Analysis.—Calc.: N, 14.94. Found: N, 1521.

The following compounds were prepared according to the above procedure by substituting the appropriate amine for di-n-propylamine used therein.

N-ethyl-N-n-propyl 2,6-dinitro - p - toluidine, M.P.=42–43.5° C. Analysis.—Calc.: N, 14.94. Found: N, 13.92. N-n-butyl-N-n-propyl 2,6-dinitro-p-toluidine. Analysis.—Calc.: N, 12.23. Found: N, 14.02. N,N-diethyl 2,6-dinitro-p-toluidine. Analysis.—Calc.: N, 16.54. Found: 17.72. N,N - di - n-butyl 2,6-dnitro-p-toluidine. Analysis.—Calc.: N, 13.58. Found: 13.54. N-n-propyl-N-t-butyl-2,6-dinitro-p-toluidine, M.P.=86–88° C. Analysis.—Calc.: N, 14.23. Found: N, 14.12. N,N-diethyl-2,6-dinitro-p-toluidine, M.P.=95–97° C. Analysis.—Calc.: N, 18.66. Found: N, 18.59. N-allyl-N-ethyl-2,6-dinitro-p-toluidine. Analysis.—Calc.: N, 15.84. Found: 15.31. N,N-diallyl-4-methyl-2,6-dinitroaniline, M.P.=37–38° C. Analysis.—Calc.: N, 15.15. Found: N, 15.42. N-(4-methyl-2,6-dinitrophenyl)-pyrrolidine, M.P.=94–95° C. Analysis.—Calc.: N, 16.72. Found: N, 16.78.

EXAMPLE 9.—PREPARATION OF N-ETHYL-N-n-PROPYL 2,6-DINITROANILINE

One-quarter mole of 4-chloro-2,6-dinitroaniline was dissolved in 200 ml. of xylene. One-half mole of N-ethyl-n-propylamine was added. The reaction mixture was heated to refluxing temperature for about 4 hours. The reaction mixture was cooled, and N-ethyl-n-propylamine hydrochloride, which was formed as a by-product of the reaction, was separated by filtration. The filtrate containing N-ethyl-N-n-propyl 2,6-dinitroaniline formed in the above reaction was evaporated to dryness. The residue was dissolved in ethanol, and the solution was decolorized with activated charcoal, concentrated, and cooled, thus yielding crystals of N-ethyl-N-n-propyl 2,6-dinitroaniline melting at about 38–40° C. Analysis.—Calc.: N, 16.60. Found: N, 16.60.

EXAMPLE 10.—PREPARATION OF N-n-BUTYL-N-n-PROPYL 2,6-DINITROANILINE

A mixture containing 0.5 m. of N-n-propyl-n-butylamine and 0.25 m. of 2,6-dinitrochlorobenzene was heated to refluxing temperature for about 4 hours. Crystalline N-n-propyl-n-butylamine hydrochloride, formed as a by-product in the above reaction, was separated by filtration, and the filtrate containing N-n-butyl-N-n-propyl 2,6-dinitroaniline was evaporated to dryness in vacuo. Trituration of the dark, oily residue with hexane yielded crystalline N-n-butyl-N-n-propyl 2,6-dinitroaniline upon cooling at about 0° C. The compound, however, melted somewhere below ambient room temperature. It was isolated by filtration at about 0° C. Analysis.—Calc.: N, 14.93. Found: N, 14.96.

EXAMPLE 11.—PREPARATION OF N,N-DIETHYL 2,6-DINITRO-4-CHLOROANILINE

Ten grams of 1,4-dichloro-2,6-dinitrobenzene were added to a solution of 8.8 g. of diethylamine in 50 ml. of ethanol. The reaction mixture was heated to refluxing temperature for about 14 hours, was then cooled, diluted with 50 ml. of water, and was evaporated to about one-half its volume, causing the appearance of a precipitate of N,N-diethyl 2,6-dinitro-4-chloroaniline. The precipitate was recrystallized from ethanol, yielding, N,N-diethyl 2,6-dinitro-4-chloroaniline melting at about 40–41° C. Analysis.—Calc.: N, 15.35. Found: N, 15.54.

EXAMPLE 12.—PREPARATION OF N,N-DI-n-BUTYL 4-CHLORO-2,6-DINITROANILINE

Following the procedure of Example 11, 10 g. of 1,4-dichloro-2,6-dinitrobenzene and 15.5 g. of di-n-butylamine were heated together in ethanol solution, forming N,N-di-n-butyl 4-chloro-2,6-dinitroaniline. The compound melted below room temperature, and the solid compound was isolated from a solution chilled to about 0° C. by using a filter funnel cooled in a dry-ice-ethanol mixture. Analysis.—Calc.: N, 12.74. Found: N, 12.66.

EXAMPLE 13.—PREPARATION OF N,N-DIMETHYL 4-CHLORO-2,6-DINITROANILINE

Following the procedure of Example 11, 4.5 g. of 1,4-dichloro-2,6-dinitrobenzene and 3 g. of dimethylamine dissolved in ethanol were heated together, forming N,N - dimethyl 4 - chloro - 2,6 - dinitroaniline. The compound melted at about 105–108° C. after recrystallization from ethanol. Analysis.—Calc.: N, 17.10. Found: N, 16.90.

N,N-di-allyl 4-chloro-2,6-dinitroaniline is prepared by substituting di-allylamine for dimethylamine in the above example.

EXAMPLE 14.—PREPARATION OF N,N-DI-n-PROPYL 4-TRIFLUOROMETHYL-2,6-DINITROANILINE

Fifty grams of 4-chloro-3,5-dinitrobenzoic acid were reacted with 50 g. of sulfur tetrafluoride in an autoclave at 120° C. for 7 hours to form 4-trifluoromethyl-2,6-dinitrochlorobenzene. Evaporation of the reaction mixture to dryness left a solid residue comprising 4-trifluoromethyl-2,6-dinitrochlorobenzene, which was purified by recrystallization from a hexanebenzene solvent mixture. Crystalline 4 - trifluoromethyl - 2,6 - dinitrochlorobenzene thus prepared melted at about 53–57° C. Analysis.—Calc.: N, 10.35. Found: N, 9.90.

Eight and one-tenth grams of 4-trifluoromethyl-2,6-dinitrochlorobenzene were mixed with 10 ml. of di-n-propylamine, and the reaction mixture was heated at about 100° C. for about 2 hours. The reaction mixture was diluted with ether and was filtered to remove di-n-propylamine hydrochloride formed as a by-product in the reaction. The filtrate was washed with dilute hydrochloric acid and then was evaporated to dryness in vacuo. The residue containing N,N-di-n-propyl 4-trifluoromethyl-2,6-dinitroaniline, was recrystallized from hexane and melted at about 41–43° C. Analysis.—Calc.: C, 46.57; H, 4.81; N, 12.53. Found: C, 46.56; H, 4.9; N, 12.62.

The following compounds were prepared by the above procedure by substituting the appropriate amine for di-n-propylamine.

N,N-diethyl 2,6-dinitro-4-trifluoromethylaniline, M.P.= 93.5–95° C. Analysis.—Calc.: N, 13.68. Found: N, 13.77.

N,N - diisobutyl 4 - trifluoromethyl - 2,6 - dinitroaniline, M.P.=71–72° C. Analysis.—Calc.: N, 11.57. Found: N, 11.36.

N,N - di - sec - butyl 4 - trifluoromethyl-2,6-dinitroaniline. Analysis.—Calc.: N, 11.57. Found: N, 11.54.

N-methyl-N-n-butyl 4 - trifluoromethyl-2,6-dinitroaniline, M.P.=49–51° C. Analysis.—Calc.: N, 13.08. Found: N, 13.22.

N-ethyl-N-n-butyl 4 - trifluoromethyl - 2,6 - dinitroaniline, M.P.=65–66.5° C. Analysis.—Calc.: N, 12.53. Found: N, 12.76.

N-ethyl-N-n-propyl 4-trifluoromethyl - 2,6 - dinitroaniline, M.P.=89–91° C. Analysis.—Calc.: N, 13.08. Found: N, 13.35.

N,N-dimethyl 4-trifluoromethyl-2,6-dinitroaniline, M.P.= 123.5–125° C. Analysis.—Calc.: N, 15.05. Found: N, 15.00.

N-allyl-N-methyl 4 - trifluoromethyl - 2,6 - dinitroaniline, M.P.=63–64° C. Analysis.—Calc.: N, 13.76. Found: N, 14.06.

N,N-diallyl 4-trifluoromethyl-2,6-dinitroaniline, M.P.= 61–62° C. *Analysis.*—Calc.: N, 12.69. Found: N, 12.42.

N-methyl-N-2-chloroallyl 4-trifluoromethyl - 2,6 - dinitroaniline, M.P.= 72–74° C. *Analysis.*—Calc.: N, 12.37. Found: N, 12.21.

N,N - dipropargyl 4 - trifluoromethyl - 2,6 - dinitroaniline. *Analysis.*—Calc.: N, 12.84. Found: N, 12.67.

N-(4 - trifluoromethyl - 2,6 - dinitrophenyl) - pyrrolidine, M.P.=100–102° C. *Analysis.*—Calc.: N, 13.77. Found: N, 13.95.

N - (4 - trifluoromethyl - 2,6 - dinitrophenyl) - piperidine, M.P.=104–105° C. *Analysis.*—Calc.: N, 13.16. Found: N, 13.04.

N-methyl-N-(2,2 - dimethoxyethyl) 4-trifluoromethyl-2,6-dinitroaniline, M.P.= 63.5–65° C. *Analysis.*—Calc.: N, 11.87. Found: N, 11.97.

N-ethyl-N-(2-methoxyethyl) 4 - trifluoromethyl - 2,6 - dinitroaniline, M.P.=49–51° C. *Analysis.*—Calc.: N, 12.46. Found: N, 12.34.

N-n-propyl-N-(3-methoxypropyl) 4 - trifluoromethyl-2,6-dinitroaniline, M.P.=48–50° C. *Analysis.*—Calc.: N, 11.50. Found: N, 11.42.

N-n-propyl-N-(2,2-diethoxyethyl) 4-trifluoromethyl - 2,6-dinitroaniline. *Analysis.*—Calc.: N, 10.26. Found: N, 10.48.

EXAMPLE 15.—PREPARATION OF N,N-DI-n-PROPYL 2,6-DINITRO-p-ANISIDINE

Following the procedure of Example 1, 4-methoxy-2,6-dinitrochlorobenzene was reacted with di-n-propylamine to yield N,N-di-n-propyl 2,6-dinitro-p-anisidine which was not crystalline at ambient room temperature. *Analysis.*—Calc.: N, 14.13. Found: N, 13.88.

Following the above procedure, diethylamine was reacted with 4-methoxy-2,6-dinitrochlorobenzene to yield N,N-diethyl 2,6-dinitro-p-anisidine which melted at about 74–76° C. after recrystallization from hexane. *Analysis.*—Calc.: N, 15.61. Found: N, 15.78.

EXAMPLE 16.—PREPARATION OF N,N-DI-n-PROPYL 4-CYANO-2,6-DINITROANILINE

Following the procedure of Example 1, di-n-propylamine was reacted with 4-cyano-2,6-dinitrochlorobenzene to yield N,N-di-n-propyl 4-cyano-2,6-dinitroaniline. The compound melted at about 104–106° C. after recrystallization from an ethyl acetatehexane solvent mixture. *Analysis.*—Calc.: N, 19.17. Found: N, 19.06.

EXAMPLE 17.—PREPARATION OF N,N-DI-n-PROPYL 4-DIMETHYLCARBAMYL-2,6-DINITROANILINE

Twenty-four and five-tenths grams of 4-chloro-3,5-dinitrobenzoic acid were dissolved in 20 ml. of ethanol. Forty-seven milliliters of di-n-propylamine were added to the ethanol solution in dropwise fashion. The reaction mixture was heated to refluxing temperatures for about one hour and was then cooled. About two-thirds of the solvents present were removed by evaporation in vacuo. The resulting residue was added to an equal volume of water, whereupon an oily layer comprising 3,5-dinitro-4-(di-n-propylamine)benzoic acid formed in the above reaction, separated. The aqueous layer was made acidic with 10 percent HCl, thus causing further oily product to separate. After standing for about one hour, the oil solidified and was separated by filtration. M.P.=95–100° C. *Analysis.*—Calc.: N, 13.50. Found: N, 13.45.

Thirty-two grams of 3,5-dinitro-4-(di-n-propylamino) benzoic acid were mixed with 50 ml. of thionyl chloride. The reaction mixture was heated in the range 60–75° C. for about three hours. The reaction mixture was allowed to stand for about 14 hours at ambient room temperature after which time the volatile constituent and the excess of thionyl chloride were removed by evaporation in vacuo. Fifty milliliters of benzene were added and the volatile constituents were again removed by evaporation in vacuo. The resulting residue consisted of 3,5-dinitro-4-(di-n-propylamino)benzoyl chloride which was a solid.

Five grams of 3,5-dinitro-4-(di-n-propylamino)benzoyl chloride in 250 ml. of benzene. Gaseous dimethylamine was passed into the resulting solution for about one hour. A precipitate formed, comprising dimethylamine hydrochloride produced as a by-product in the above reaction. The precipitate was removed by filtration. Evaporation of the resulting filtrate yielded N,N-di-n-propyl-4-dimethylcarbamyl-2,6-dinitroaniline melting at about 117–119° C. *Analysis.*—Calc.: N, 16.56. Found: N, 16.60.

EXAMPLE 18.—PREPARATION OF N,N-DI-n-PROPYL 2,6-DINITRO-m-TOLUIDINE

Following the procedure of Brady and Gibson, J. Chem. Soc. 119, 99 (1921), m-nitrotoluene was nitrated at about 50° C. An oily fraction was separated from the nitration mixture by centrifugation and this oily fraction was then renitrated in a similar nitration mixture. The oily fraction was again separated and poured into cold water. The oily fraction was washed several times with water and was then dissolved in benzene and washed free of acid with aqueous sodium bicarbonate. Removal of the benzene yielded a crude nitration product weighing about 148 g. A four-gram sample of this crude product was chromatographed over neutral alumina using mixtures of benzene and hexane as the eluting solvents. After 650 ml. of a 50–50 benzene-hexane mixture had been passed over the column, the eluant was changed to 19:1 benzene-hexane mixture. The first 150 ml. fraction with this eluant contained pure 2,3,4-dinitrotoluene which crystallized readily upon evaporation of the solvents. The crude nitration product was then crystallized by dissolving it in ethyl alcohol, cooling the resulting solution to about 50° C., and seeding it with crystals obtained by the chromatography procedure above. Constant repetition of this crystallization procedure by concentrating, cooling, and seeding each succeeding filtrate, eventually yielded about 6.6 g. of pure 2,3,4-trinitrotoluene melting at about 107–109.05° C.

Two grams of 2,3,4-trinitrotoluene were added to 2 g. of di-n-propylamine. The resulting mixture was allowed to remain at ambient room temperature for about 24 hours. It was then heated at about 100° C. for about 14 hours. The volatile constituents were removed by evaporation in vacuo. The resulting residue, comprising N,N-di-n-propyl 2,6 - dinitro - m - toluidine was recrystallized from hexane using a dry-ice bath as a cooling media. The crystalline product thus obtained melted below room temperatures. *Analysis.*—Calc.: N, 14.94. Found: N, 14.75.

I claim:

1. The method of selectively eliminating germinating and seedling weed grasses and germinating and seedling broadleaf weeds from an area without destroying mature grasses, germinating and seedling crop plants, and mature crop plants therein, which comprises applying to said area an effective amount of a herbicidal compound represented by a formula of the group consisting of:

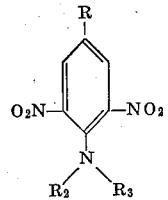

and

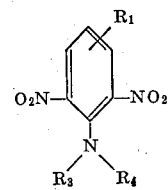

wherein R is a member of the group consisting of hydrogen, lower alkyloxy and di-lower alkyl carbamyl; $R_1$ is a member of the group consisting of lower alkyl, cyano, halo-substituted lower alkyl and halo; $R_2$ is a radical of the group consisting of ethyl, n-propyl, n-butyl, sec-butyl, isobutyl and lower alkyloxy-substituted lower alkyl; $R_3$ and $R_4$, when taken singly, are members of the group consisting of $C_1$–$C_5$ alkyl, $C_2$–$C_5$ alkenyl, $C_2$–$C_5$ alkynyl, halo-substituted $C_2$–$C_5$ alkenyl, lower alkyloxy-substituted lower alkyl, and di-lower alkyloxy-substituted lower alkyl; $R_2$ and $R_3$, and $R_3$ and $R_4$, when taken together with the nitrogen atom to which they are attached, form a member of the group consisting of pyrrolidino and piperidino; such that the sum of the carbon atoms in the hydrocarbon groups represented by $R_2$ and $R_3$ together, and by $R_3$ and $R_4$ together, is less than nine.

2. The method of claim 1 wherein the herbicidal compound is N,N-di-n-propyl 4-trifluoromethyl-2,6-dinitroaniline.

3. The method of claim 1 wherein the herbicidal compound is N,N-di-n-propyl 2,6-dinitro-p-toluidine.

4. The method of claim 1 wherein the herbicidal compound is N-ethyl-N-n-propyl 4-trifluoromethyl-2,6-dinitroaniline.

5. The method of claim 1 wherein the herbicidal compound is N-n-butyl-N-ethyl 4-trifluoromethyl-2,6-dinitroaniline.

6. The method of claim 1 wherein the herbicidal compound is N,N-diallyl 2,6-dinitro-p-toluidine.

7. A process according to claim 1, wherein the herbicidal compound is applied at a rate from 0.1 to 20 lbs. per acre.

References Cited by the Examiner

UNITED STATES PATENTS

| | | | |
|---|---|---|---|
| 2,999,114 | 9/1961 | Kouba | 260—577 |
| 3,015,550 | 1/1962 | McMahan | 71—2.3 |
| 3,067,254 | 12/1962 | Wilder | 260—576 |
| 3,088,978 | 5/1963 | Brunner et al. | 260—577 X |
| 3,102,803 | 9/1963 | Wilder | 71—2.3 |
| 3,111,403 | 11/1963 | Soper | 71—2.3 |
| 3,119,736 | 1/1964 | Clark et al. | 167—30 |

OTHER REFERENCES

Barche et al.: Chemical Abstracts, 1911, vol. 5, p. 2079.

Hantzsch: Deutsche Chemische Gesell-Schaft Berichte, 1910, vol. 43, pp. 1662–1685 (page 1674 particularly relied upon).

Joshi et al.: Chemical Abstracts, 1934, vol. 28, p. 469.

LEWIS GOTTS, *Primary Examiner.*

JULIAN S. LEVITT, JAMES O. THOMAS,

*Assistant Examiners.*